United States Patent [19]

Uhlinger

[11] 4,341,629
[45] Jul. 27, 1982

[54] MEANS FOR DESALINATION OF WATER THROUGH REVERSE OSMOSIS

[75] Inventor: Robert A. Uhlinger, Carlsbad, Calif.
[73] Assignee: Sand and Sea Industries, Inc., Carlsbad, Calif.
[21] Appl. No.: 937,324
[22] Filed: Aug. 28, 1978
[51] Int. Cl.$^3$ .............................................. B01D 31/00
[52] U.S. Cl. .................................. 210/128; 210/138; 210/259; 210/433.2
[58] Field of Search ............... 210/23 H, 500 M, 259, 210/321 R, 433 M, 96 M, 128, 138, 321.1, 433.2

[56] References Cited

U.S. PATENT DOCUMENTS

| | | | |
|---|---|---|---|
| 3,654,148 | 4/1972 | Bradley | 210/23 H |
| 3,839,201 | 10/1974 | Miller | 210/500 M X |
| 3,846,295 | 11/1974 | Gibbs | 210/321 R X |
| 3,856,676 | 12/1974 | Grimme, Jr. et al. | 210/259 X |

*Primary Examiner*—Frank A. Spear, Jr.
*Attorney, Agent, or Firm*—Duane C. Bowen

[57] ABSTRACT

Water from a source is fed to a reverse osmosis unit having a membrane which divides the stream into a first permeate product and a first concentrate. The first permeate product is stored in a tank until a selected quantity is collected and then the source is disconnected from the pump which next delivers water from the tank to the reverse osmosis unit to divide the stream into a second permeate product and a second concentrate. In one version of the equipment the second permeate is processed by a different membrane than that producing the first permeate. In another version, the same membrane is used, the second permeate product is stored, and the second permeate product is later run through the reverse osmosis unit to produce a third permeate product and a third concentrate. A further version, especially applicable to processing other water sources intruded by sea water, is somewhat like the first version except only one membrane is used and a second permeate product is added to a first permeate product in a storage tank until a product of a satisfactory level of salinity is reached. The addition of the second permeate to the first permeate may be thought of as a dilution step in processing. In all versions of the system, only a single pump is used to convey and pressurize the liquids. Control of some tank-filling and tank-emptying operations is achieved by use of float-operated switches and time-delay units are associated with those switches in order to eliminate effects of sloshing on the switches.

2 Claims, 9 Drawing Figures

MEANS FOR DESALINATION OF WATER THROUGH REVERSE OSMOSIS

BRIEF SUMMARY OF THE INVENTION

My invention concerns a reverse osmosis separation system which is improved in some respects for certain applications over prior systems. The improvement includes the concept of using only a single pump, although the liquid is to be subjected to reverse osmosis membrane separation more than once. The use of one or more small temporary storage tanks permits the use of a single pump.

BACKGROUND

Seawater desalination installations using reverse osmosis processes have increased significantly within the past five years. Prior to 1973, the primary systems for seawater conversion by reverse osmosis was the two-stage, two-pump unit. Separate types of modified cellulose acetate membrane modules were employed in two separate reduction stages to reach a potable product below 500 PPM total dissolved solids. With the introduction of a new process membrane by DuPont and others, the hollow fine fiber module, designs employed only one stage using one pump at a higher operative pressure to accomplish desalination. In the two stage systems, the classical pre-treatment of the membrane feed consisted of filtration, injection of chlorine and acid and polyphosphate. This enabled the sanitizing and pH adjustment and a scale prevention for maintaining membrane life. The hollow fine fiber type employing a polyamide polymer material can not tolerate free chlorine: pre-treatment and pre-filtration and chemical injection have become more critical. The post treatment in both cases employed decarbination and often post-neutralization and chlorination for potable storage.

The above systems are designed for a large demand installation such as commercial and municipal installations, which are primarily for land based areas. Very little work is currently being undertaken for the small privately maintained "point of use" areas. These areas specifically include the marine (shipboard), land-sea based (offshore), and the remote installations of the world. These areas have limited low power source available and lack sources of chemical for pre and post treatment methods. Therefore, this invention was conceived in order to fulfill the need for a small, compact, light-weight, seawater desalination plant for marine and remote land-sea based applications.

Unit "A", shown in FIGS. 1-2, employs one pump stage to feed a membrane module consisting of a modified cellulose tri-acetate. This module is capable of reducing the seawater feed salinity by 80% total dissolved solids. The product from this module is stored for a short period of time and recycled through the pump by valve means to a second and separate membrane module consisting of a modified cellulose acetate. This module is capable of reducing the feed salinity by 95% or more. This module is capable of higher rejection to salts but cannot withstand the higher seawater feed salinity that is fed through the first module. The concentrate from the second module is diverted back under pressure, through the first membrane module. This stream functions to rinse or flush the membrane of scale forming compounds that tend to collect on the membrane boundary layers. This concentrate is approximately one-third of the seawater salinity. The rinsing and diluting is required for maintaining longer membrane life.

This unit, unlike Unit B, utilizes two separate membranes in two steps of recycle storage functions to accomplish desalination of the feed water. However, it produces a greater volume of potable product for the same power used in Unit "B". This invention does not use acid or poly phosphate injection for scale prevention. Therefore, post treatment is not required. The unit does employ a small chemical feeder which periodically can inject a chlorine solution for proper sanitization of the unit.

Unit "B", shown in FIGS. 4-6, employs one pump stage to feed a membrane of modified cellulose triacetate. The permeate is stored for a short period of time and by valve means, is re-cycled. The product (permeate) from the second step is stored again and recycled for a third pass. The primary function of the recycle concept is to reduce the salinity of the feed in smaller rejection steps. The secondary function of the re-cycle concept is to flush or rinse the membrane surfaces or (boundary layers) with successively purer water. This reduces scale forming tendencies and maintains a longer membrane life. The one pump stage employed in this invention uses lower power requirements than conventional two-pump, two-stage systems. This unit employs lower pressures than newer designed hollow fine fiber systems, thus reducing the compaction of the membrane and corresponding loss of productivity over a period of time. By eliminating acid injection and scale inhibitor chemicals, the post treatment or post neutralization of the product is eliminated. This invention also employs light-weight plastic components for weight and size reduction. A further version, Unit C, later will be described.

A search was made resulting in citation of the following numbered patents by the searcher:

U.S. Pat. No. 3,498,072
U.S. Pat. No. 3,589,998
U.S. Pat. No. 3,617,550
U.S. Pat. No. 3,786,924
U.S. Pat. No. 3,821,108
U.S. Pat. No. 3,836,457
U.S. Pat. No. 3,846,295
U.S. Pat. No. 3,898,158
U.S. Pat. No. 3,956,114
U.S. Pat. No. 4,000,065
U.S. Pat. No. 4,005,012
U.S. Pat. No. 4,071,445
U.S. Pat. No. 4,080,289
U.S. Pat. No. 4,083,781

I was not familiar with the identical systems and equipment described in these patents. I don't consider most of the patents to be at all pertinent to the system described herein. U.S. Pat. No. 4,083,781 does recycle product water. U.S. Pat. Nos. 4,000,065 and 3,589,998 recycle concentrated solutions. The objective in U.S. Pat. No. 3,617,550 is to concentrate rather than to purify, but the "purer" fraction passing through a membrane 16 of the patent does pass to a feed tank 10 and then back through a membrane 14. These recycling concepts are of limited pertinency and none of the patents, individually or collectively, teach the concepts described as new herein.

OBJECTIVES

The objectives of my invention are largely suggested above and include: to provide an improved reverse osmosis separation method and means; to provide such a system adaptable to process seawater, brackish water, or highly saline municipal or well water, into potable water, and especially to provide such a system for processing seawater in small point-of-use areas such as in small ships or boats, in offshore installations, and in remote undeveloped areas of the world; to provide systems using a single pump used to pump the same water more than once, in order to minimize the level of power required and/or to reduce weight; to devise systems using storage tank means so as to be able to recycle water at a later point in time; to provide systems that are light, small, compact and economical; and to devise systems to achieve relatively long membrane lives.

My invention will be best understood, together with additional objectives and advantages thereof, from the following description, read with reference to the drawings in which.

Figure 3:
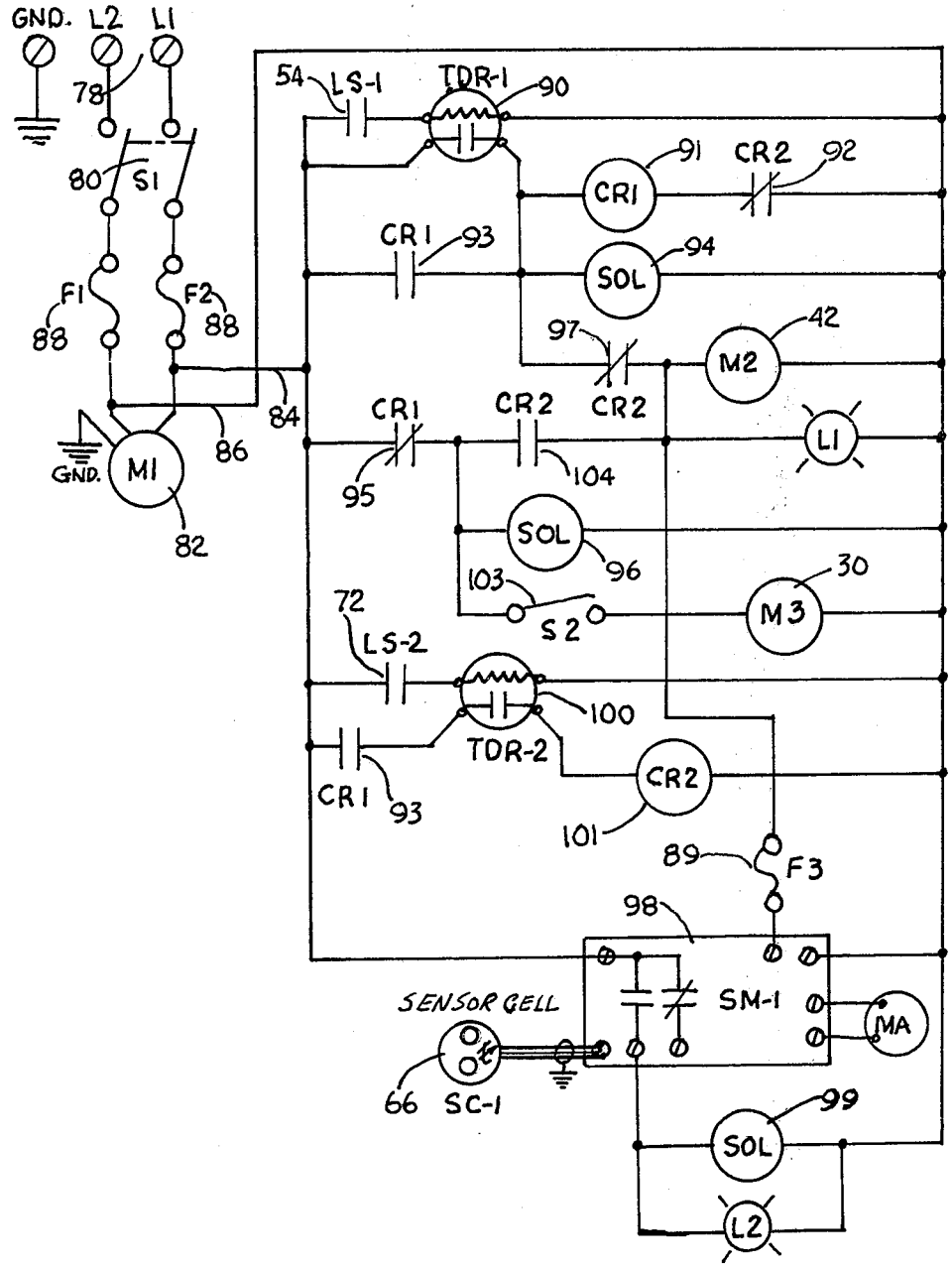

FIG. 3 also concerns Unit A and is a diagram of EE aspects of the system.

Figure 1:
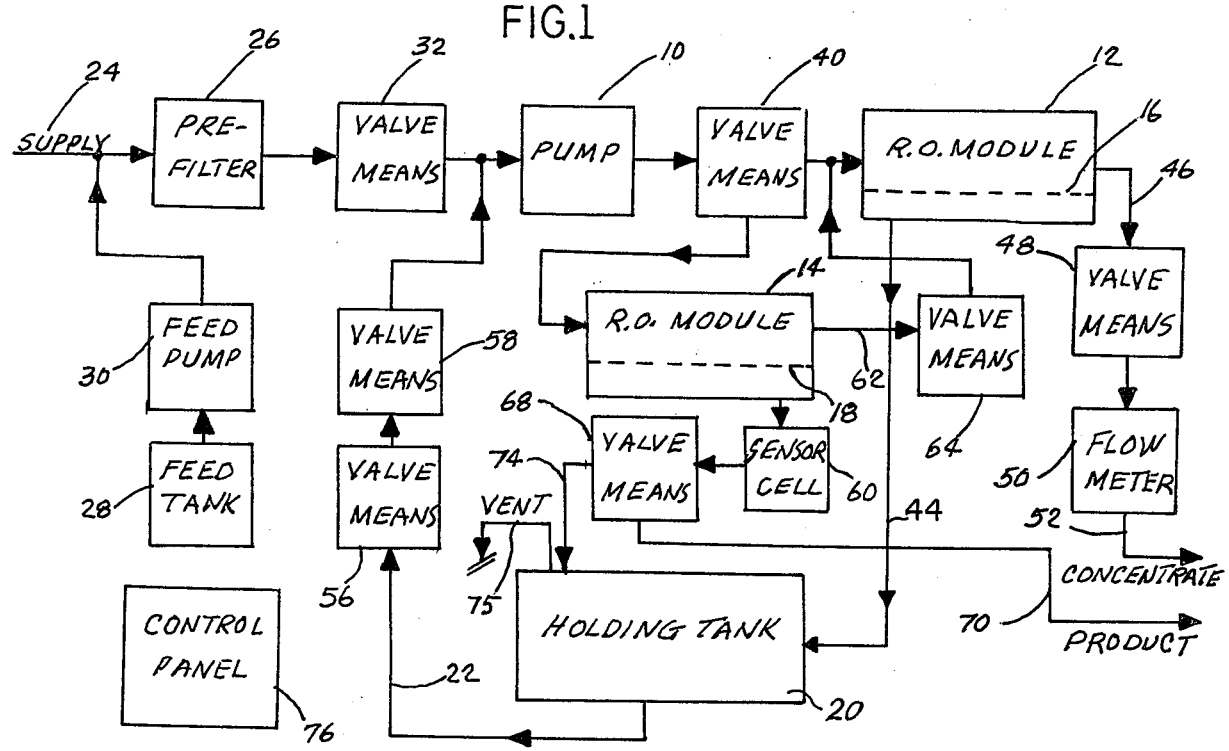
FIG. 1 is a block diagram of the flow and processing elements of a specific embodiment of my invention which is termed "Unit A".
Figure 4:
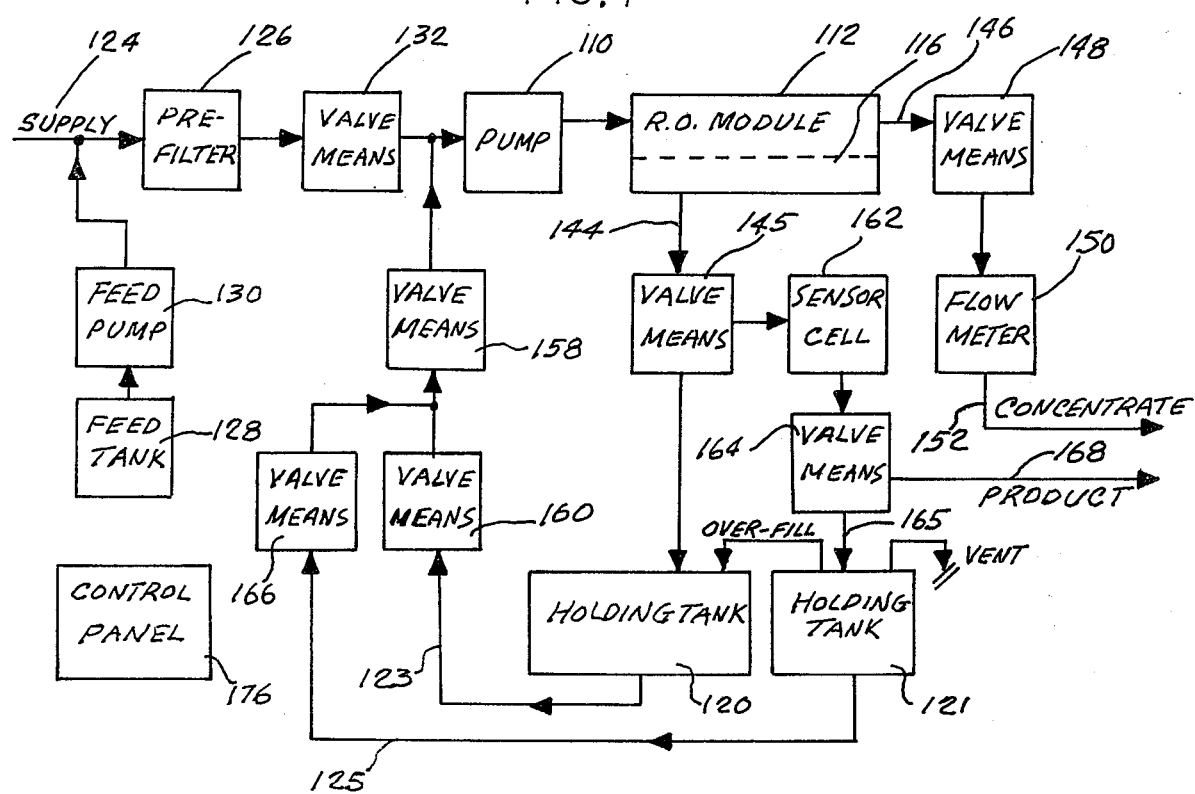

FIG. 4 is like FIG. 1 only showing a modified version of my invention called "Unit B".

Figure 2:
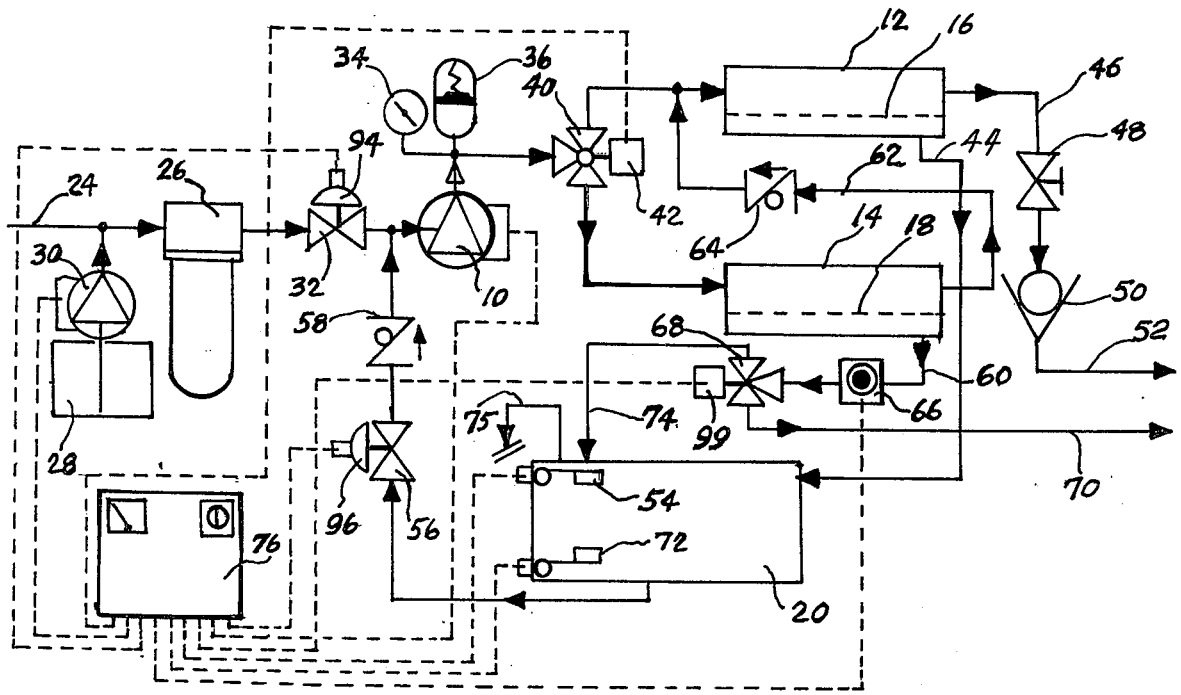
FIG. 2 is a diagram like that of FIG. 1 but detailing more valves and other hydraulic elements and more electrical relationships (largely shown symbolically).
Figure 5:
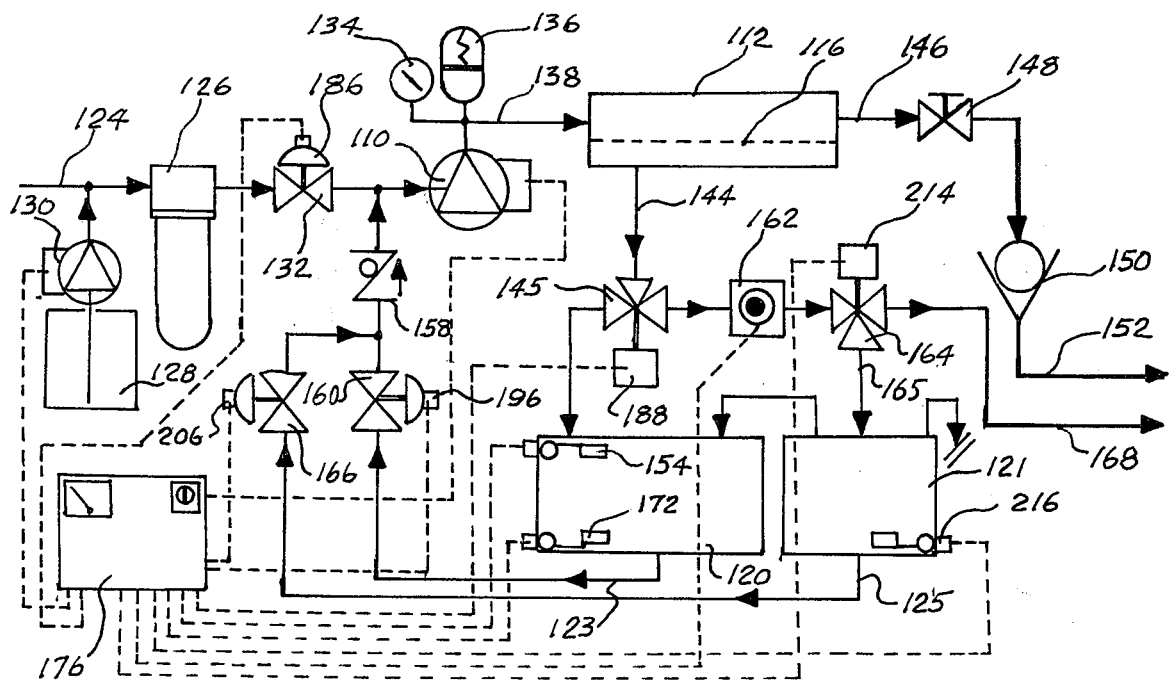

FIG. 5 is like FIG. 2 only concerning Unit B.

Figure 6:
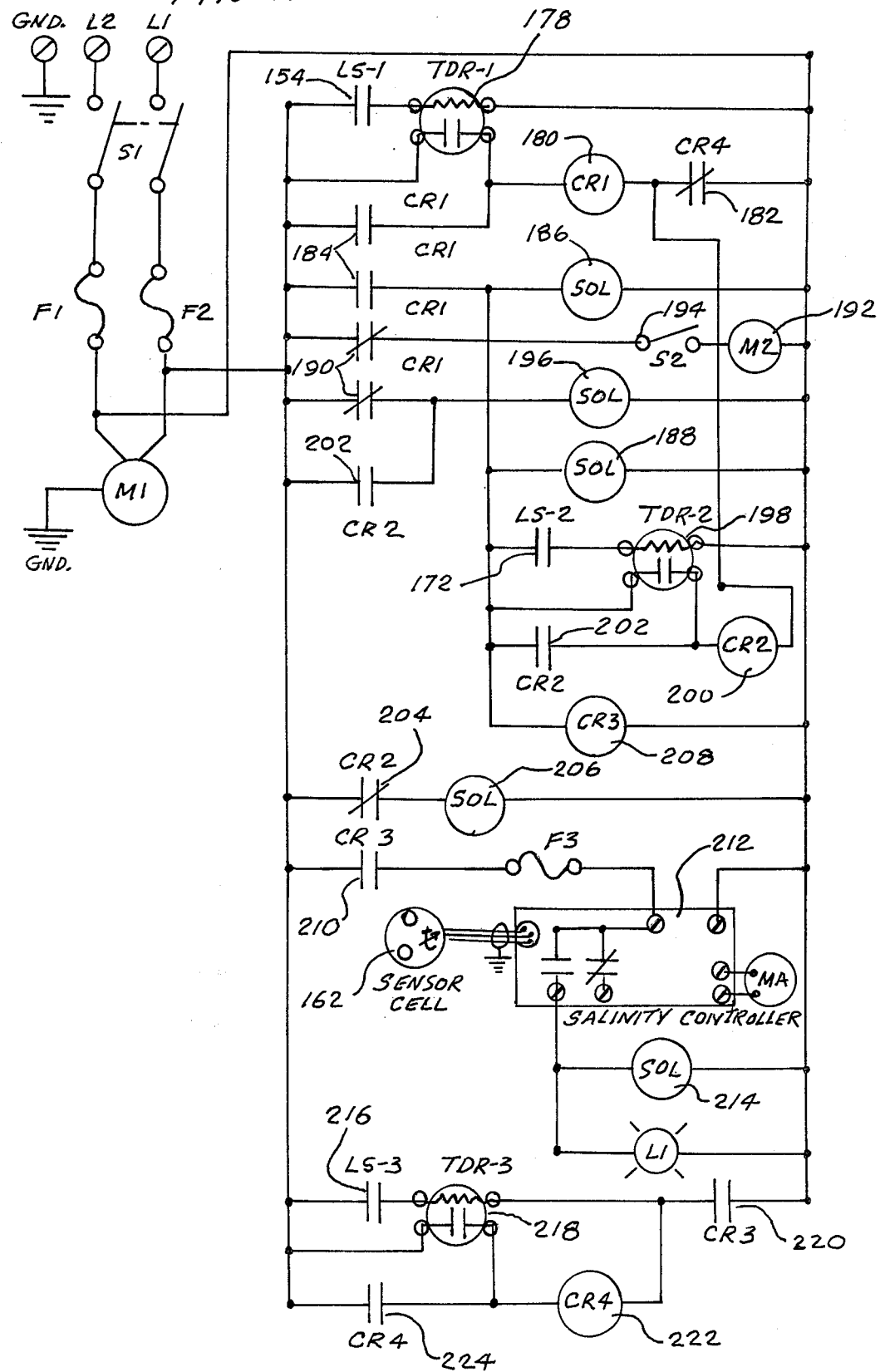

FIG. 6 is like FIG. 3 only concerning Unit B.

Figure 7:
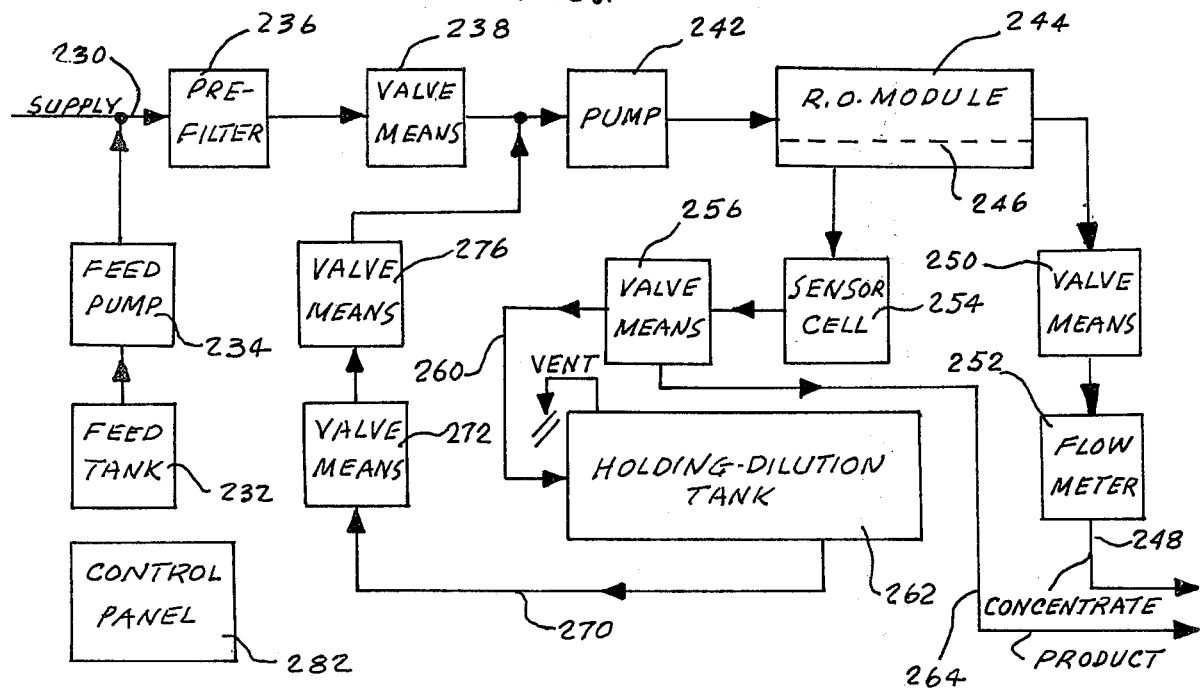

FIG. 7 is like FIG. 1 only showing a modified version of my invention called "Unit C".

Figure 8:
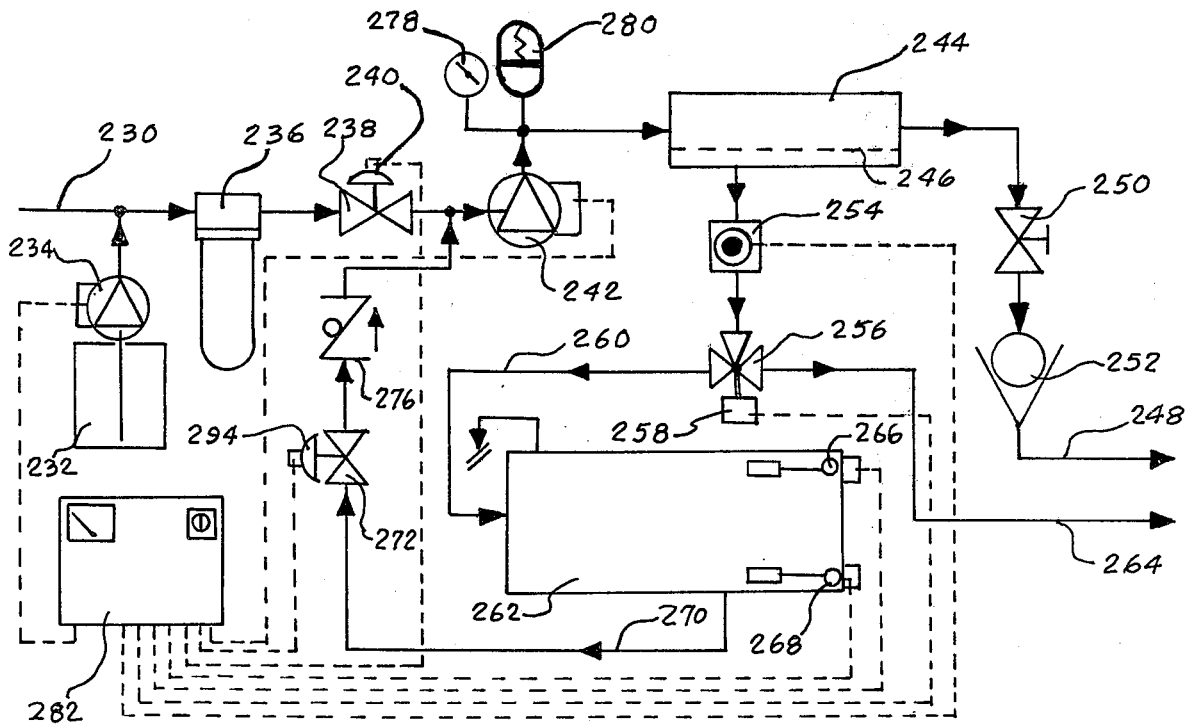

FIG. 8 is like FIG. 2 only concerning Unit C.

Figure 9:
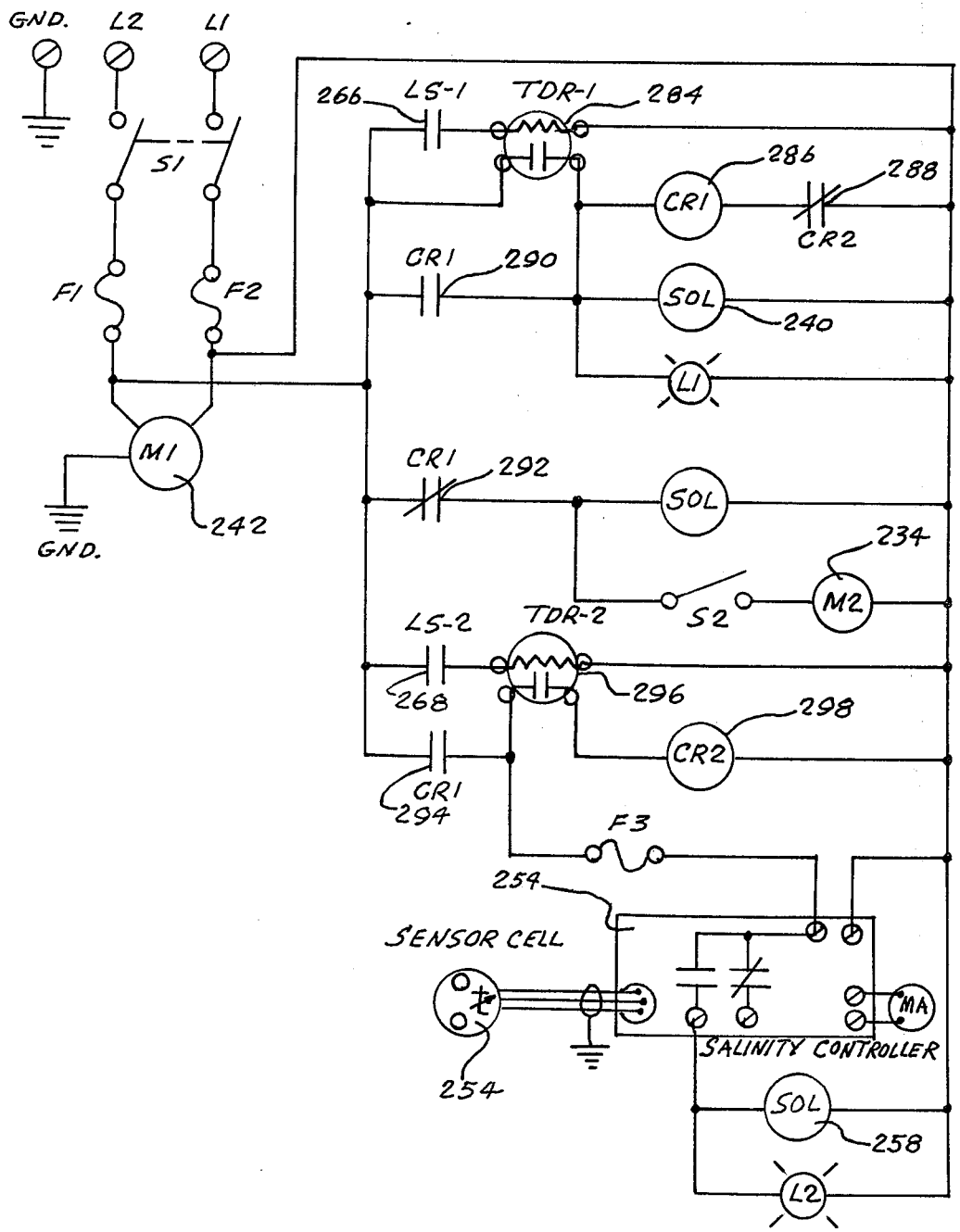

FIG. 9 is like FIG. 3 only concerning Unit C.

UNIT A

I have already indicated some aspects of Unit A which I will not completely restate in the discussion below. I will first discuss the disclosures of FIGS. 1 and 2.

Characteristics of the Unit A system include the presence of but a single pump 10, two reverse osmosis units 12, 14 having membranes 16, 18, a holding tank 20, and a recycling line 22 from tank 20 back to pump 10.

The supply source 24 most likely will be seawater but could be another type of water having an unacceptable level of dissolved salts (T.D.S.). The purpose of my invention is to convert such water into potable drinking water which is defined as below 550 ppm (parts per million) dissolved salts. As indicated before, prior desalinization systems have been too large in size and too large in power consumption to meet the requirements of most marine and land based privately owned installations which tend to be small in volume requirements and small in power availability, and often require low weight and/or inexpensive equipment. Most prior units utilized membranes having high rejection properties but high replacement costs. The present system uses much lower cost and commonly used industrial-type membranes.

The unit operates on the principle of reverse osmosis. Water from source 24 is separated by each membrane into two streams. One is the purified, permeate, product water stream which is considerably lower in salt concentration than that of the feed water. The second stream is a concentrate in which considerably more salts than in the feed water are concentrated in the stream.

Unit A uses two different and separate types of reverse osmosis membranes. The first membrane 16 is a medium-rejection type selected from those presently available on the market, formed of cellulose tri-acetate (C.T.A.) which can achieve 80% salt rejection from a seawater input. The second membrane 18 is a high-rejection type selected from those presently available on the market, formed of cellulose acetate (C.A.), which can achieve 98% salt rejection when used to process an input stream having a salt concentration lower than that of seawater, i.e., such as an input of permeate that has passed through first membrane 16.

The purpose is to use the first membrane 16 to remove 80% of the salinity of seawater, to store the permeate from membrane 16, and later to pass the first permeate through the second membrane 18, which produces a second permeate reduced in salt content about 98% compared to the first permeate, the second permeate being potable. This arrangement of membranes also results in longer membrane life and lower membrane costs.

Now reviewing the disclosure of FIGS. 1 and 2 in more detail, a pre-filter 26 is used to remove large particles and sediments. Upstream of pre-filter 26 is a source of chemicals 28 and a chemical feed pump 30 when it is desired to chemically treat the feed water with chlorine, acid, polyphosphate, or other agents, for purposes such as sanitizing, pH adjustment or scale prevention, when needed. Treatment can be continuous or periodic. Sterilization of membranes results in longer life and freedom from bacteria in the permeate delivered from Unit A.

A valve 32 controls flow of water from source 24 to pump 10. This is solenoid operated and remains open until energized to close. Pump pressure can be monitored by a gauge 34 and pump 10 is also connected to a hydraulic surge arrestor 36. Pump 10, which may be a commercially available high-pressure piston pump, may raise pressures to about 700 psi and may be powered by a commercially available electric motor operating on 120 or 240 volts A.C.

Water pumped by pump 10 is discharged by means of a high-pressure hose 38 to a valve 40 (a three-way, porting high-pressure, ball valve) operated by an actuator 42. Actuator 42 is an electric, gear-driven unit to change the ports of valve 40.

Flow from valve 40 is to a pressure vessel 12 containing CTA membrane 16. Water is divided into a first permeate product stream 44 and a first concentrate stream 46. The concentrate 46 flows under pressure through valve 48. Flow is monitored by a flow meter 50 and the first concentrate is discharged at 52. The first permeate product 44 is carried by a hose to the plastic, intermediate-stage tank 20.

Operation is continued until the water in tank 20 rises to a point where a sealed level switch 54 is located. Switch 54 controls the logic of electrical sequences. Upon switch 54 closing, valve 32 is energized and shuts off. A valve 56 in recycling line 22 is de-energized and opens up. The recycling stream also passes check valve 58. Line 22 is now open to pump 10. In the meantime valve 40 has had its ports changed by actuator 42 so that discharge from pump 10 is directed to second reverse osmosis unit 14 instead of first reverse osmosis unit 12.

The foregoing means that the first permeate product is delivered from tank 20 to second reverse osmosis pressure vessel 14. The second CA membrane 18 divides the first permeate product into a second permeate product stream 60 and a second concentrate stream 62.

Second concentrate 62 is used to flush out first membrane 16 and is then discharged. There is a check valve 64 between second reverse osmosis unit 14 and re-entry of second concentrate stream 62 into first reverse osmosis unit 12. The second concentrate is then discharged through line 46, past valve 48 and meter 50, to discharge point 52.

The second permeate product 60 passes a sensor cell 66 (measuring dissolved salts by conductivity). A three-way diverting valve 68 can divert the second permeate back into tank 20 through line 74 if cell 66 senses that the potable standard has not been reached. On the other hand, if the second permeate is satisfactory it can be delivered to the point of use through output line 70.

A second level switch 72 senses the end of the delivery of the first permeate when the level of water therein lowers to that extent (or senses the end of the delivery of the combination of first permeate and of second permeate delivered through redelivery line 74). When second level switch 72 closes, that initiates resetting of the electrical sequences that control the various valves, so that again seawater from source 24 is delivered through pump 10 to first reverse osmosis unit 12.

A test on Unit A produced potable water quality of 258 ppm total dissolved solids, when the feed water had 36,000 ppm T.D.S. and the water temperature was 60° F. The size unit in question produced 8–10 gallons per hour. A second test was conducted using two membranes in series at location 12 and two membranes in series at location 14, and this modified unit produced about 20 gallons per hour.

A control panel 76 is indicated in FIGS. 1 and 2. The power source for a prototype was 120 volts, as indicated in FIG. 3, connected to the input 78. Switch 78 acts both as a disconnect and a control for motor 82 which provides power to pump 10. Switch 80 also provides power to the control circuits via leads 84, 86. Fuses 88 provide short-circuit protection for motor 82.

The first logic function is initiated by the high level switch 54. When the water in tank 20 reaches the level of switch 54, the switch closes and powers the time delay relay 90. Time delay of a few seconds prevents effective closure of switch 54 by mere sloshing of water in tank 20 such as by movement of a boat or ship in which Unit A is installed.

Time delay relay 90 closes contacts and powers control relay CR1 (91) through CR2 (92). Also CR1 (91) is held in a holding circuit by CR1 (93). The solenoid 94 is energized and shuts off seawater feed to pump 10. At the same time, CR1 (95) opens contacts and solenoid 96 opens for flow for holding tank 20 via pump 10. CR2 (97) is closed, allowing power to energize gear actuator 42 which switches the high pressure valve 40 one hundred and eighty degrees to divert its flow to the second stage recycle membrane 18. A DSI light indicates this and the salinity monitor-controller 98 is now energized. It now controls the product flow out of the unit or diverts the flow back into the holding tank 20, by means of solenoid 99, if water quality does not meet potable standards.

The second level switch is low-level switch LS2 (72) that closes upon emptying of holding tank 20. Upon operation of switch 72, time delay relay TDR2 (100) closes after a few seconds delay (to prevent operation merely due to sloshing in tank 20). Then power flow to control relay CR2 (101), and contact CR2 (92) opens and cancels all logic power to control relay CR1 (91), thus resetting the cycle. Power can then flow though CR1 (95) and CR2 (104) to valve actuator motor M2 (42) turning the high pressure valve 40 one hundred and eighty degrees back to its starting position and diverting seawater to membrane 16. Solenoid 96 again closes valve 56. Solenoid 94 and valve 32 are in open position for feeding seawater and the motor FEED M3 for feed pump 30 is on if its switch 103 is closed.

UNIT B

Unit B, shown in FIGS. 4–6, has considerable in common with Unit A shown in FIGS. 1–3, but has some significant differences.

Smaller systems for use on boats or ships of modest requirements, or for other small volume use, are currently being proposed by others using high (98–99%) salt rejection membranes such as polyamide, hollow, fine-fiber membranes or polyamides in spiral wound membranes. Replacement costs of such high salt rejection membranes are excessively high and their overall lives are low. Disinfection of such high salt rejection membranes with common solutions of chlorine is not feasible and cleaning of the membranes is difficult.

Unit B can use common industrial-quality, spiral-wound CTA membranes with medium (80%) salt rejection. Such membranes are less expensive than high rejection membranes and my apparatus is considerably smaller. Unit B employs the idea of recycling, meaning that cleaner water is used in each pass to flush the membrane of impurities, thus gaining longer life. The system uses only one type of membrane, as contrasted to Unit A which uses two types of membranes. Only one type of membrane needs to be stocked by the user.

Some of the basic components of Unit B include pump 110, a reverse osmosis unit 112 having a membrane 116, a first holding tank 120, a second holding tank 121, a common recycling line 122, lines 123, 125 from tanks 120, 121 to line 122, a supply source 124 of seawater or other water with dissolved salts to be processed, a pre-filter 126, a source of chemicals 128 to treat inleted water, a pump 130 to feed the chemicals, a solenoid operated valve 132 between supply source 124 and pump 110, a pump gauge 134, a hydraulic surge arrestor 136, a hose 138 between pump 110 and reverse osmosis unit 112, a permeate product stream 144, a concentrate stream 146, a valve 148 in line 146, a flow meter 150 in line 146, and a discharge of concentrate 152.

Some of the other parts having counterparts in Unit B include check valve 158 in recycling line 122, control panel 176 and upper level switch 154 and lower level switch 172 in holding tank 120.

Now dealing more particularly in areas of difference between Unit B and Unit A, water from source 124 is separated by medium rejection membrane 116 of reverse osmosis unit 112 which reduces salinity about 80% in the first permeate product which passes through line 144, past solenoid controlled valve 145 to holding tank 120, whereas the first concentrate passes out discharge 152.

Tank 120 can hold twenty gallons, for example. When the level of switch 154 is reached, switch 154 initiates operation of electrical control logic relays and operates valve 132. Valve 132 shuts off supply of seawater 124 and valve 160 in line 123 from tank 120 opens to common recycling line 122. This means the first permeate product in tank 120 enters pump 110 and passes into reverse osmosis unit 112 and is separated into a second concentrate discharged out line 146 and a second permeate product that passes into line 144. Valve 145 has been changed to divert the second permeate past sensor 162 to valve 164 which diverts the second permeate through line 165 to second holding tank 121. The second permeate in tank 121 is reduced about 80% in salt content from the first permeate.

The water level in tank 120 is lowered until lower level switch 172 is operated which controls logic relays to open valve in line 125 from holding tank 121 to common recycling line 122. Valve 160 from tank 120 closes and valve 164 diverts from connecting to line 165 to tank 121 to permeate product discharge line.

It will be understood at this point that the second permeate product from tank 121 goes through pump 110 to reverse osmosis unit 112 resulting in a third concentrate which passes out discharge 152 and a third permeate that is delivered out outlet 168. The third permeate again has reduced 80% in salt content from the second permeate. A low level switch 124 in tank 121 is actuated when tank 121 is emptied, which actuates another logic relay, and the entire control logic circuit is re-set to start over, i.e., valve 166 is shut, valve 160 is shut, valve 132 is opened, valve 145 is diverting back to tank 120, valve 164 is diverting back to tank 121, etc. The pump remains running through the entire cycle and is shut off by a manual switch.

Note, however, that the above cycle is modified if sensor 162 detects too highly salinity in the second permeate, in which case the sensor initiates action whereby valve 145 continues to divert to tank 120 until a proper salinity level is reached at the point of sensor 162. Note also that if two reverse osmosis membranes were substituted for one at point 112 (either splitting the stream into two parallel streams in going through area 112 or arranging the same in series), the apparatus would operate in a like manner, with only capacity or degree of salt rejection changed.

The EE diagram of FIG. 6 is like FIG. 3 in various aspects including the input of power and the functions represented by the symbols L1, L2, S1-M1, and F2 will not be redescribed and discussion will begin with the logic circuits.

The first logic step is the closing of the contacts of high level switch LS1 (154) of tank 120. Power flows to the time delay relay TDR1 (178) after a few seconds delay to prevent response merely to sloshing of water in tank 120. Upon closing of relay 178, the control relay CR1 (180) is energized via contact CR4 (182). Relay 180 is then held in by a holding circuit contact CR1 (184), which also energizes solenoid 186 of inlet valve 132, closing valve 132 to terminate feed of seawater to pump 110. Solenoid 188 is also energizing operating valve 145. CR1 (190) opens contact, deenergizing chlorine feed pump motor M2 (192) via switch SW2 (194) if it is closed. CR1 (190) also opens contact at solenoid 196 for valve 160, thereby deenergizing the valve solenoid and permitting valve 160 to open, whereby water from tank 120 can be fed to pump 110.

Low level switch 172 closes upon emptying of tank 120 and powers time delay relay TDR2 (198) which, after a few seconds delay, closes its contacts. Power then flows to control relay CR2 (200), contact CR2 (202) closes at this time as a hold-in circuit for relay 200 and contact 202 also closes energized solenoid 196 thereby shutting off water flow through valve 160. CR2 (204) at the same time opens contacts and deenergizes solenoid 206 thereby operating valve 166 so that water passes from tank 121 to pump 110. CR3 (208) is also energized and power through contact CR3 (210) energizes the salinity monitor-control 212. Monitor 210 controls solenoid 214 and if water quality is acceptable solenoid 214 is energized operating valve 164 which delivers permeate product water at 168. If water is not acceptable, the water is diverted back to tank 121 for further purification.

The third logic function is initiated by the low-level switch LS3 (216) at the bottom of tank 121, which closes when the tank is emptied and powers time delay relay TDR3 (218) which applies power (after a few seconds delay) through CR3 (220). Power energizes CR4 (222) and contact CR4 (224) closes as a hold-in circuit. Contact CR4 (182) opens and de-energizes logic circuits CR1 and CR2, thus resetting all relays back to the starting point. Solenoid 186 opens to fee seawater, solenoid 188 diverts permeate product to holding tank 120, etc.

UNIT C

The foregoing descriptions of Units A and B involve certain interrelated subsystems or features including, among other things, (a) the use of a single pump, (b) the use of a tank to hold a permeate product for reprocessing, and (c) the use of valved means controlled by a salinity measuring cell which diverts a permeate product back to the tank for further reprocessing when the final product is of too high salinity.

A further version of my invention, called "Unit C", utilizes the above elements (a), (b) and (c), in a somewhat different form, which may be thought of as a "dilution" configuration. Unit C can be considered to be a modification of the Unit A system, i.e., to be more closely related to Unit A than Unit B. Unit C is especially useful in areas where ground and water sources are slowly being replaced by seawater, i.e., seawater intrusion. Such water subject to intrusion may have 10–20,000 ppm TDS, as contrasted to 35–37,000 ppm TDS in seawater. With the lower salinity, a less complex system is especially applicable. I have successfully tested a system like Unit C with a single industrial type membrane and fewer parts than Units A and B. In fact, Unit C is operable with seawater although I believe it has special applicability to other pure water sources suffering seawater intrusion. The tank should be slightly larger than those of Units A and B, i.e., 30 gallon. Membranes should have longer life working with water subject to intrusion due to reduced salinity in the feed water.

FIGS. 7–9 show the Unit C configuration. The water supply source 230 as above indicated could be seawater or water of lesser salinity. Chemical treatment could be provided from agents in chemical feed tank 232 delivered by chemical feed pump 234 and filtering 236 can be provided for water from source 230. Inlet of water from source 230 is controlled by inlet valve 238 which is operated by solenoid 240. A single pump 242 is used to pressurize water delivered to the reverse osmosis unit 244 which has an 80%, industrial quality membrane 246. If more capacity were required, two membranes could be linked in parallel at this point (to operate in the circuit like one unit). Concentrate is outleted from the system at 248, passing en route a high-pressure control valve 250 and a flow meter 252. Permeate flows from reverse osmosis unit 244 past a sensor cell 254 (that can continuously monitor salinity of water passing that point) to a valve 256 (operated by a solenoid 258) which normally delivers fluid to line 260 to tank 262 but will deliver permeate to outlet 264 when solenoid 258 is operated. Tank 262 has an upper level switch 266 and a lower level switch 268. Line 270 connects to pump 242 but flow therethrough is controlled by valve 272 controlled by solenoid 274, check valve 276 and inlet valve 238. Other elements include pressure gauge 278, hydraulic surge arrestor 280 and control panel 282.

Unit C may be compared with Unit B (FIGS. 4-6) as using the same membrane 246 (modified cellulose triacetate, spiral wound, or equal) capable of reducing seawater 80% in salinity, as using a single holding tank 262, as employing two less solenoid valves, as having one less level switch, and as having less complex electrical control circuitry, as will be observed from comparing FIG. 9 with FIG. 6. The product from membrane 246 is monitored by the salinity monitoring unit 254 which can reference conductivity to 500 ppm TDS as a standard of maximum salinity.

One of the ways Unit C differs from Unit B is that it continuously diverts not only first permeate but also second permeate from reverse osmosis unit 244 through line 260 to the holding or dilution tank 262, to dilute the first permeate with the second permeate until the salinity measuring cell 254 senses that salinity of the permeate passing the same is at 500 ppm or below, whereupon the reaction of salinity monitoring unit 242 results in solenoid 258 being operated to adjust valve 256 to deliver the permeate to outlet 264. As indicated before, a larger tank 262 may be used than in Units A and B, i.e., thirty gallons capacity has been calculated to be preferable.

Other than as indicated above, the operation of the parts and the cycle of the system is much like those in Units A and B, as will be understood from FIGS. 7-9 by those skilled in the art.

I will not recite various details of electrical circuitry obvious from FIG. 9. The first logic function is initiated by the closing of the high level switch LS-1 (266) when the first permeate in tank 262 reaches that level. Operation of switch 266 powers time delay relay TDR-1 (284), which delays closing a few seconds to avoid responding to mere sloshing or turbulence. At the end of the delay, TDR-1 (284) powers control relay CR1 (286) through contacts CR2 (288). CR1 is held in by a holding circuit through contacts CR1 (290). Solenoid 240 is now energized and closes, terminating feedwater supply to the motor of pump 242. At the same time, solenoid 274 in the holding tank line 270 is de-energized and opens by way of CR1 (292). The chemical feed pump M2 (234) also is de-energized at this time. CR1 (294) is also closed by CR1 (286) and powers the salinity-sensor and controller-monitor 254. Sensor 254 monitors permeate product passing through line 260 until the desired quality (i.e., 550 ppm) is reached, whereupon operation of solenoid 258 results in adjustment of valve 256 to deliver permeate to outlet 264.

The second level switch LS-2 (268) is closed upon the water level being lowered to the bottom of tank 262 and time delay relay TDR-2 (296) is powered. After a few seconds delay, power flows across TDR-2 (296) to control relay CR2 (298). This opens contacts CR2 (288) and de-energizes the holding circuit of CR1 (286), thereby effectively resetting all logic back to the starting condition. Solenoid 240 closes, and solenoid 258 causes new permeate to be diverted to the tank 262.

Having thus described my invention, I do not wish to be understood as limiting myself to the exact construction shown and described. Instead, I wish to cover those modifications of my invention that will occur to those skilled in the art upon learning of my invention and which are within the proper scope thereof.

I claim:

1. Means for the desalination of water through reverse osmosis, comprising:
   (a) a single pump to pressurize water in the system,
   (b) a source of water to be processed and reverse osmosis means including a membrane and operative automatically to continuously divide said water to be processed into a first permeate product and a first concentrate,
   (c) said source of water to be purified being connected to said pump and said pump being connected to said reverse osmosis means to supply said water to be processed under pressure,
   (d) a tank and means connecting said tank to said reverse osmosis means operative automatically to continuously receive and to store the first permeate product,
   (e) valved operating means operative to disconnect said source of said water to be processed from said pump and to connect said tank to said pump to run said first permeate product through said reverse osmosis means a second time to produce a second permeate product and a second concentrate.
   (f) a float-operated switch in said tank operating when the level of said first permeate product reaches a selected level, said valved operating means being automatically operative to disconnect said source and to connect said tank upon operation of said switch,
   (g) a second lower float-operated switch in said tank operating when the level of said first permeate product has returned from said selected level to near empty and said valved operating means automatically operating upon operation of said second switch to discontinue feeding said first permeate product to said pump, and
   (h) said float-operated switches and said valved operating means having time delay means so that the influence of sloshing on said switches is eliminated.

2. Means for the desalination of water through reverse osmosis, comprising:
   (a) a single pump to pressurize water in the system,
   (b) a source of water to be processed and reverse osmosis means including a membrane and operative automatically to continuously divide said water to be processed into a first permeate product and a first concentrate,
   (c) said source of water to be purified being connected to said pump and said pump being connected to said reverse osmosis means to supply said water to be processed under pressure,
   (d) a tank and means connecting said tank to said reverse osmosis means operative automatically to continuously receive and to store the first permeate product,
   (e) valved operating means operative to disconnect said source of said water to be processed from said pump and to connect said tank to said pump to run said first permeate product through said reverse osmosis means a second time to produce a second permeate product and a second concentrate,
   (f) said reverse osmosis means including a membrane used both for said water to be processed and for said first permeate product, there being a second tank receiving said second permeate product and said second tank connected to said reverse osmosis means to separate said second permeate product into a third permeate product and a third concentrate, (g) the first-mentioned tank having an upper and a lower float-operated switch and said second tank having a lower float-operated switch and said float-operated switches and said valved operating means automatically operating to disconnect said source from said pump when said first-mentioned tank is full and to connect said first-mentioned tank to said pump, to disconnect said first-mentioned tank to said pump and to connect said second tank to said pump when said first-mentioned tank empties, and to disconnect said second tank from said pump and to reconnect said source to said pump when said second tank empties, and (h) said float-operating switches and said valved operating means having time delay means so that said switches are not effective until selected times have passed so that the influence of sloshing on said switches is eliminated.

* * * * *